Feb. 8, 1955     A. A. MILLER     2,701,707
WHEEL LIFTING IMPLEMENT
Filed June 12, 1952

INVENTOR.
August A. Miller
BY Henry G. Dybvig
His Attorney

# United States Patent Office 2,701,707
Patented Feb. 8, 1955

2,701,707
WHEEL LIFTING IMPLEMENT

August A. Miller, Dayton, Ohio

Application June 12, 1952, Serial No. 293,098

2 Claims. (Cl. 254—131)

This invention relates to a wheel changing device and more particularly to a wheel changing device including a lug wrench associated with a hairpin-like member having fulcrums integral therewith, the hairpin-like member being adaptable for use both in removing the hub cap or the wheel cap and for prying the wheel into position, although not necessarily so limited.

The device disclosed herein is related to the device disclosed in my copending application Serial No. 204,840, filed January 8, 1951, now Patent No. 2,619,320, for Tire Changing Device.

In changing automobile wheels, several operations are required utilizing tools. In the first place, it is necessary to remove the hub cap or the wheel cap, sometimes referred to in the trade as a "Calnevar," which requires a prying tool and preferably a prying tool so designed that sufficient force may be applied to remove the hub cap or the wheel cap with a comparatively slight effort on the part of the person changing the wheel. This is generally followed by the use of a lug wrench in removing the nuts used in holding the wheel or lugs in position, as the case may be. When a wheel is to be inserted, it may be quite heavy and difficult to raise into position manually. After the wheel has been positioned, it is necessary to tighten the nuts holding the lugs or wheel in position, again requiring a lug wrench.

In the past two or more tools have been used for carrying out these operations. At times a large screwdriver may be used for removing the hub cap or the wheel cap. Then a lug wrench is used for the nuts in changing the wheel.

An object of this invention is to provide a wheel changing device wherein several tools are combined into a unitary structure, so that one tool may be used for carrying out the sequence of operations, the first being the removal of the hub cap or the wheel cap, this followed by removal of the nuts. Then the same device may be used in lifting the replacement wheel into position and finally used in tightening the nuts, so as to secure the wheel or the rim, as the case may be, into position.

Another object of this invention is to provide a hairpin-like tool wherein the legs of the hairpin-like tool have deflected portions forming substantially U-shaped bends functioning as fulcrums intermediate the ends of the hairpin-like member, the hairpin-like member being reinforced by a member spanning the legs intermediate their ends and preferably seated and welded to the outer extremities of the U-shaped bends or deflected portions, so that the U-shaped bends of the hairpin-like member may be used as a fulcrum when lifting the wheel into position.

Other objects and advantages reside in the construction of parts, the combination thereof and the mode of operation, as will become more apparent from the following description.

Figure 1:
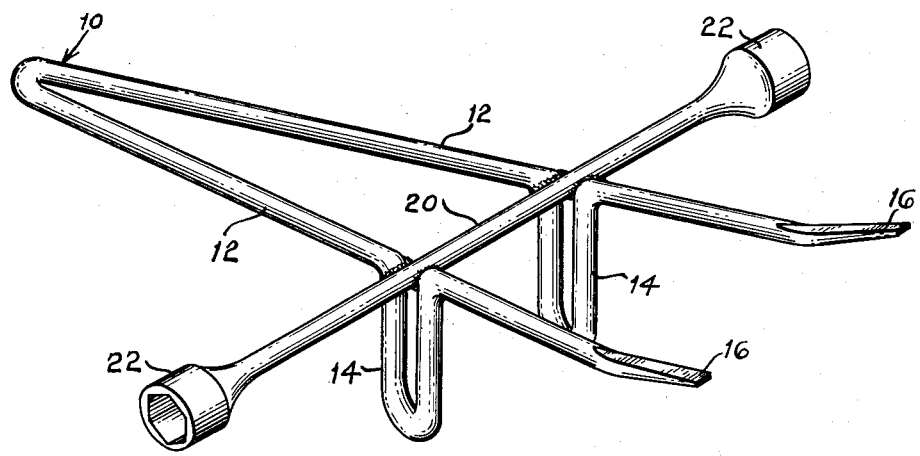
Figure 1 is a perspective view of the wheel changing device.
Figure 3:
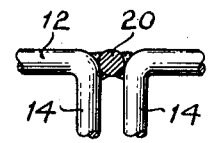
Figure 3 is a cross sectional view taken substantially on the line 3—3 of Figure 2.
Figure 2:
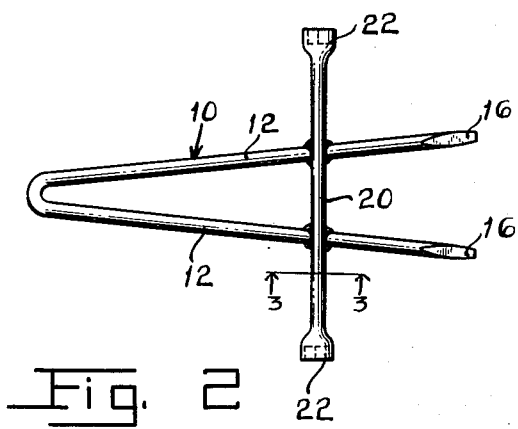
Figure 2 is a top plan view.

Referring to the drawings, the reference numeral 10 designates a hairpin-like main frame member provided with a pair of legs 12, each provided with a U-shaped deflected portion or bend 14, the outer extremities of the legs 12 being tightly arched and provided with flattened screwdriver-like tips 16.

In order to reinforce the hairpin-like member 10, a bar 20 is welded to the outer extremities of the U-shaped bends 14. The ends of the bar 20 are provided with socket wrenches 22. By this arrangement the screwdriver-like tips 16 may be used in prying off the hub cap or the wheel cap, as the case may be. The socket wrenches 22 are used for removing the nuts. When the socket wrench is used, the hairpin-like member 10 functions as a handle for the socket wrench.

Figure 4:
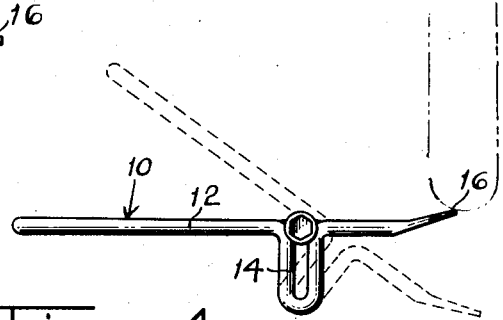
Figure 4 is a side elevational view showing the device used in lifting the wheel into position.

After the wheel has been removed and it is found desirable to raise the replacement wheel into position, the tool may be used in lifting the wheel into position, as shown in Figure 4, wherein the U-shaped bends 14 function as fulcrums, the bight of the U providing a lever or a pedal for the hand. When used in lifting a wheel into position, the bar 20 reinforces the hairpin-like member so as to prevent failure thereof. Furthermore, when the socket wrench is used, the hairpin-like member functions as a convenient handle in exerting the necessary force to remove or tighten nuts, as the case may be.

Although the preferred embodiment of the device has been described, it will be understood that within the purview of this invention various changes may be made in the form, details, proportion and arrangement of parts, the combination thereof and mode of operation, which generally stated consist in a device capable of carrying out the objects set forth, as disclosed and defined in the appended claims.

Having thus described my invention, I claim:

1. A wheel changing tool comprising a hairpin-like member provided with longitudinally extending U-shaped bends intermediate the ends of the legs of said hairpin-like member, the ends of the legs of said hairpin-like member having flattened curved portions, reinforcing means for holding the legs of said hairpin-like member in spaced relation comprising a member extending transversely of the legs and welded integral therewith within the U-shaped bends in bridging relation of the arms of the U, the said U-shaped bends providing a fulcrum for the tool whereby the flattened curved end portions of said legs may be inserted under a tire to be mounted on an axle and lifted into position by the exertion of a force on the other end of said legs about said fulcrum.

2. A tool for lifting a wheel comprising a hairpin member, flattened curved cradle-like portions at one end of the legs of said hairpin member for receiving a tire, the juncture of the legs forming a handle at the other end of said hairpin member, reinforcing means extending transversely of said legs for holding the legs in spaced relation, a fulcrum formed by a U-shaped bend intermediate the end of each of the legs of said hairpin member so that by positioning the tire at one end of the tool and exerting a force at the other end about the fulcrum the wheel may be lifted into position for mounting on the axle, said reinforcing means being welded in bridging relation of the arms of the U to prevent spreading of the U-shaped bends.

References Cited in the file of this patent

UNITED STATES PATENTS

| Number | Name | Date |
|---|---|---|
| 827,250 | Measer | July 31, 1906 |
| 845,717 | Miller | Feb. 26, 1907 |
| 2,195,635 | Smischny | Apr. 2, 1940 |
| 2,569,242 | Kors | Sept. 25, 1951 |
| 2,619,320 | Miller | Nov. 25, 1952 |
| 2,639,121 | Hudspeth | May 19, 1953 |

FOREIGN PATENTS

| 501,643 | Belgium | Mar. 31, 1951 |